United States Patent
Glorioso

[15] 3,689,163
[45] Sept. 5, 1972

[54] PRECISION REFERENCE POINT DETECTOR

[72] Inventor: Charels A. Glorioso, Skokie, Ill.
[73] Assignee: Teletype Corporation, Skokie, Ill.
[22] Filed: Dec. 28, 1970
[21] Appl. No.: 101,695

[52] U.S. Cl. ..............356/172, 250/225, 350/157, 356/114, 356/116
[51] Int. Cl. ...........................................G01b 11/26
[58] Field of Search................556/172, 114–116; 250/225, 231; 350/157, 285; 33/125 A

[56] References Cited

UNITED STATES PATENTS

| | | | |
|---|---|---|---|
| 1,978,434 | 10/1934 | Maris | 356/115 |
| 2,924,142 | 2/1960 | Normarski | 350/157 |
| 3,495,910 | 2/1970 | Kuroha et al. | 356/115 |
| 2,996,625 | 8/1961 | Neergaard | 250/225 |

*Primary Examiner*—Ronald L. Wibert
*Assistant Examiner*—J. Rothenberg
*Attorney*—J. L. Landis and R. P. Miller

[57] ABSTRACT

A precision reference point detector includes a pair of relatively displaceable, wedge-shaped, birefringent prisms juxtaposed with their respective optic axes in orthometric relationship and having their thick sides and thin sides correspondingly oriented. Polarized light rays are passed through the prisms, a pair of coplanar quarter-wave plates and an analyzer onto a photoreceptor where they are converted into electrical signals. A rotatable light chopper, interposed in the light path between the quarter-wave plates and the analyzer, selectively blocks the light emerging from alternate quarter-wave plates such that the light impinging on the photoreceptor is alternately advanced and retarded 90° in phase. When a relative displacement at right angles to the light path is imparted to the prisms, detector circuitry coupled to the photoreceptor receives and demodulates a symmetrical amplitude modulated signal having a carrier at the chopping frequency and an envelope having diminishing intensity peaks with sharply defined nulls therebetween. A reference position for the quartz prisms may be defined by the null between the two highest peaks as observed on a measuring instrument at the detector output. By affixing one of the prisms to a movable instrumentality or workstage while the remainder of the apparatus, including the other prism, remains fixed in space, the null may be utilized to define a reference position for the instrumentality.

12 Claims, 10 Drawing Figures

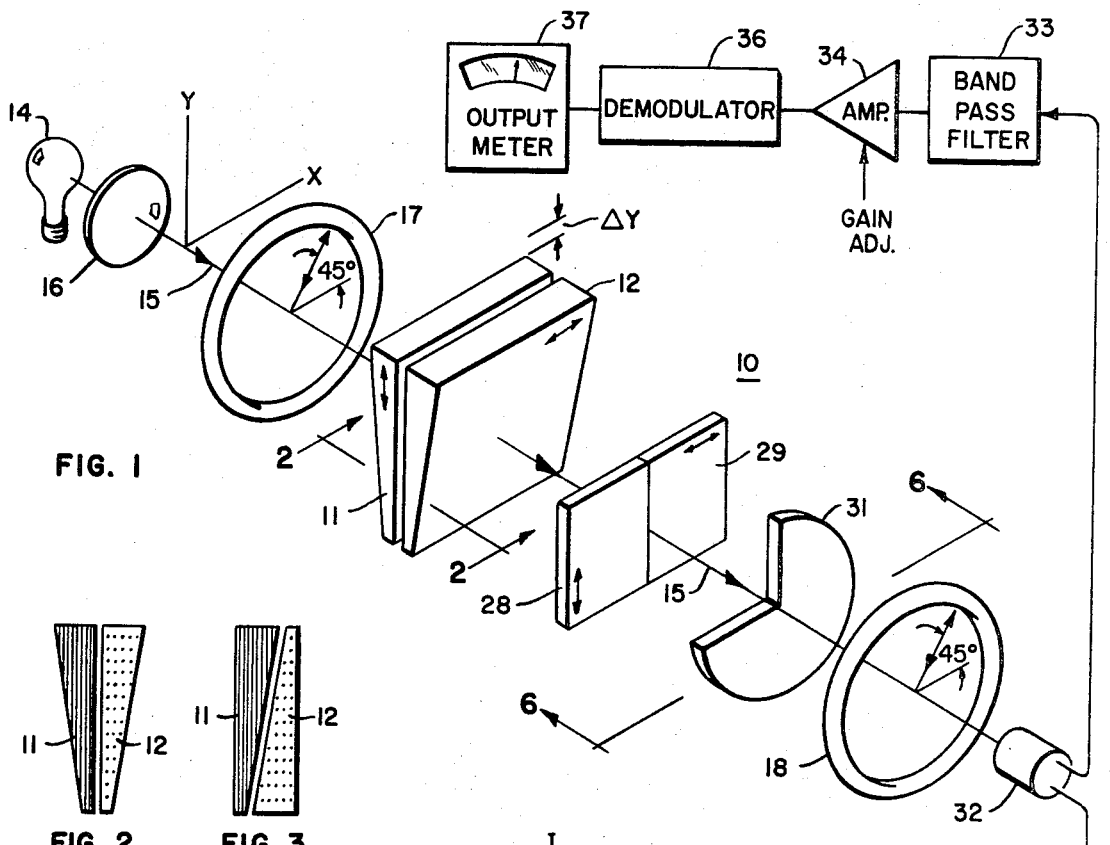

PRECISION REFERENCE POINT DETECTOR

BACKGROUND OF THE INVENTION

The present invention relates to optical measuring systems, and, more particularly, to a polarimetric device capable of being utilized to provide a home, zero or reference position along a linear path for an optical distance measuring device.

Optical measuring systems are capable of measuring minute distances with much greater accuracy than other types of measuring equipment. Laser interferometers, for example, have been utilized to measure distances and thicknesses in terms of the wavelength of light. Such measuring systems, however, are differential in character and, to be expediently employed, require supplementary means for providing an external reference point from which absolute values of distance along a linear path may be determined. In providing such supplementary means it becomes manifest that the precision with which the reference point can be re-established be compatible with the precision of the measuring device.

SUMMARY OF THE INVENTION

An object of this invention is to provide a referencing polariscope for indicating a predetermined alignment between a pair of juxtaposed double-refracting prisms.

A further object of this invention is to provide a method and apparatus for indicating a reference position along a linear path for an optical measuring apparatus, said reference position having a repeatability to within 1 or 2 microinches.

With the foregoing objects in view, one embodiment of the present invention contemplates a precision referencing polariscope for identifying a point along a predetermined linear path wherein plane-polarized light is directed through a pair of wedge-shaped juxtaposed birefringent prisms having their optic axes in orthometric relationship and having their thick sides and thin sides correspondingly oriented. The prisms are relatively displaceable along a linear path at right angles to the light path. The light emerging from the prisms is analyzed, detected and converted into an electrical signal which varies with the relative displacement of the prisms and has a definitive characteristic at a predetermined point along the linear path.

The definitive characteristic may be a centrally located peak of maximum light intensity occuring at a predetermined relative displacement of the prisms. The peak may be read from a galvanometer or other measuring instrument. The predetermined displacement may be utilized thereafter to define a reference position for a movable instrumentality to which one of the prisms may be secured while the remainder of the apparatus is fixed in space.

The preferred embodiment of the present invention includes modulating means positioned in the light path for cyclically shifting the phase of the light emerging from the prisms to generate first and second electrical signals the magnitude of whose difference is thereafter used to produce a composite signal having a more sharply defined referencing characteristic, i.e., a precisely defined central null occurring between two high peaks of signal intensity.

DESCRIPTION OF THE DRAWINGS

A more complete understanding of the invention will be obtained from the following detailed description of a specific embodiment thereof, when read in conjunction with the following drawings, wherein:

FIG. 1 is a perspective view and partial block schematic of the precision referencing polariscope of the invention;

FIG. 2 is a side view of a pair of wedge-shaped birefringent prisms, particularly illustrating the positional relationship therebetween and the respective directions of their optic axes, taken along the line 2—2 of FIG. 1;

FIG. 3 is a side view, similar to FIG. 2, illustrating the positional relationship and the directions of the optic axes of a pair of wedge-shaped birefringent prisms as they are utilized in a Babinet compensator;

FIG. 4 is a graph comprising two identical curves phase displaced by 180°, each illustrating light intensity as a function of the relative displacement between the birefringent prisms of FIGS. 1 and 2;

FIG. 5 is a graph comprising the magnitude of the algebraic difference of the curves of FIG. 4;

DETAILED DESCRIPTION

Figure 6A:
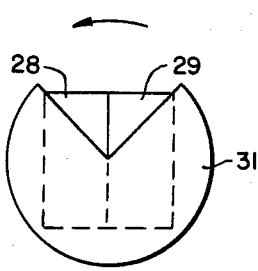
FIGS. 6($a$), 6($b$), 6($c$) and 6($d$) are taken along the line 6—6 of FIG. 1 and show representative positions of a light chopper with respect to a pair of one-quarter wave plates.

Referring to FIG. 1, there is shown a reference polariscope 10 for providing an indication of the relative displacement between a pair of wedge-shaped double-refracting or birefringent prisms 11 and 12.

White light from a suitable source 14 is directed along an optical axis 15 of the polariscope 10 and is collimated by a suitable collimating lens 16. The collimated rays from the lens 16 pass through any suitable polarizer 17 which may be, for example, of the dichroic crystal type such as Polaroid or a Glan-air prism, having an axis of polarization at an angle of 45° with respect to a pair of coordinate axes X and Y. The light emerging from the polarizer 17 is thus linearly polarized in a plane at 45° to the X and Y coordinate axes.

The prisms 11 and 12 are juxtaposed in the path of the polarized light beam thick-side-to-thick-side and thin-side-to-thin-side with their respective inclined edges facing away from one another. The optic axes of prisms 11 and 12 are parallel to the Y and X axes, respectively, as shown by the arrows in FIG. 1 and the parallel lines and dots of FIG. 2. Prism 11 is mounted for linear movement in the Y direction while prism 12 and the remainder of the polarimeter 10 are fixed in space. Both prisms may be, for example, of quartz cut at an angle of 2½°.

As thus far described, the polariscope 10 is similar to a well-known optical device commonly referred to as a Babinet compensator. The main difference thus far, however, is the arrangement of the quartz prisms. The arrangement of the prisms in a Babinet compensator is illustrated in FIG. 3. A comparison of FIGS. 2 and 3 reveals that in the instant device the inclined surfaces of prisms 11 and 12 of FIG. 2 are not arranged to complement one another as they are in the Babinet arrangement of FIG. 3. The instant arrangement of the prisms 11 and 12 as shown in FIG. 2 may be conveniently defined as one wherein the prisms have their thick sides and thin sides correspondingly oriented. If the prisms 11 and 12 were arranged as shown in FIG. 3, an observer looking at the surface of prism 12 through a polarization analyzer 18, which may be similar to polarizer 17, having an axis of polarization at 45° to the X and Y axes, would see an interference pattern composed of a parallel series of equidistant bands, the bands being in the gray area near the center of the field of bands and becoming multicolored near the fringes.

In the instant device, an observer looking through the analyzer 18 sees a uniform intensity across the surface of prism 12. If prism 11 is moved a distance $\Delta Y$ with respect to prism 12, the observed intensity varies with the movement. The characteristic of the intensity I, as a function of the relative displacement of the quartz prisms 11 and 12 in the Y direction, is similar to the solid line curve 19 of FIG. 4. As shown in FIG. 4, the curve 19 is definitively characterized by a central peak of intensity 21, having a value $I_{max}$, flanked by a symmetrical pattern of alternating nulls and peaks which decay in a few cycles to some median value of intensity $I_{min}$. The curve 19 represents the interference pattern generated by the prism arrangement of FIG. 2.

From FIG. 4, it will be realized that the central peak of intensity 21 may be utilized to define a reference position for the prism 11 with respect to prism 12. By securing the prism 11 to a movable object or instrumentality, such as a movable table or bed, while the remainder of the assembly and the other prism 12 is affixed on a base or the like, the movable object may be returned to a reference position merely by observing when the $I_{max}$ value is obtained. The observer may be replaced by a photoelectric device coupled to a galvanometer, the maximum deflection thereof indicating the central peak 21 of the curve 19 and therefore the reference position for the table. The system described, however, would only be precise to within 5 mils at best with quartz wedges cut at an angle of 2½°, owing to the broadness of the central peak 21. The relative displacement of the prisms between adjacent peaks for such a system is approximately 70 mils.

If a second photoelectric device is placed adjacent to the first and a half-wave plate is inserted in the light path thereto, the output thereof will appear as the dotted curve 22 of FIG. 4. The curve 22 is an interference characteristic identical to the curve 19 but is advanced in phase by 180° with respect to the curve 19. If the magnitude of the difference between the curves 19 and 22 is taken, the resultant curve after demodulation will appear as the curve 23 of FIG. 5, having a well-defined central null 24 occurring between two equal peaks of maximum intensity 26 and 27. The position of the null 24, however, will vary with the difference in sensitivity of the photoelectric devices utilized unless they are substantially identical. The derivation of the curve 23 will be explained more thoroughly later in conjunction with the preferred embodiment of the invention.

The need for two photoreceptors may be eliminated, together with any problems arising due to differences therebetween, by chopping the light beam 15 as it emerges from the prisms 11 and 12 and before it passes through the analyzer 18 to a single photoreceptor, alternately to insert and remove a half-wave shift in the optical path of the apparatus for equal amounts of time. This can be done, for example, by fabricating a light chopper from half-wave material such as thin sheets of mica or quartz cut parallel to its optic axis. The photoreceptor output is then an amplitude modulated current, having a carrier at the chopper frequency and an amplitude envelope corresponding to the curve 23 of FIG. 5. The amplitude modulated output can be demodulated and coupled to a galvanometer for providing an indication of the occurrence of central null 24 of FIG. 5, when prism 11 attains its reference position. Such a system has a repeatability to within one or two microinches when quartz wedges cut at an angle of approximately 2½° are used; i.e., after subsequent movement the reference position may be readily re-established to within 1 or 2 microinches.

Rather than fabricating a light chopper from half-wave plate material, the same results may preferably be realized by the utilization of two quarter-wave plates and a more conventional motor driven chopper. The preferred embodiment of the referencing polariscope 10, as shown in FIG. 1, includes two quarter-wave plates 28 and 29 positioned such that their individual optic axes are normal to one another in the Y and X directions, respectively, and at 45° with respect to the initial plane of polarization of the light from the source 14.

A rotatable light chopper 31, in the form of an opaque disc having a 90° segment removed therefrom, is positioned for rotation about the optic axis 15 between the quarter-wave plates 28 and 29 and the analyzer 18. Alternatively, the light chopper 31 may be a 90° segment of a rotatable right circular cylinder having a longitudinal axis normal to the optic axis 15. The chopper 31 may be driven by an electric motor or other suitable means to alternately permit passage of the light from one or the other or both of the quarter-wave plates 28 and 29. The plate 28 advances the phase of the light therethrough 90° while the plate 29 retards the phase of the light therethrough by 90°. The light intensities alternately passed by the chopper 31 through the analyzer 18 are therefore phase-displaced by 180° with respect to one another. The individual outputs of the plates 28 and 29 correspond to the curves 22 and 19, respectively, of FIG. 4, as the prisms 11 and 12 are displaced relative to one another.

The light emerging from analyzer 18 impinges on a photoreceptor 32 which converts the light energy into an electrical signal, amplitude modulated at the chopping frequency, and having an amplitude envelope after demodulation corresponding to the magnitude of the differences of the curves 19 and 22 of FIG. 4, illustrated as the curve 23 of FIG. 5.

Assume, for example, that the wedges 11 and 12 are displaced a distance $Y_1$ with respect to each other. As shown in FIG. 4 of the drawings the magnitude of the intensity of the light passing through the plate 29, $I_{29}$, is greater than the magnitude of the intensity of the light passing through the plate 28, $I_{28}$. As shown in FIG. 5 of the drawings, the magnitude of the differences of the intensities $I_{29}$ and $I_{28}$, which are amplitude modulated at the chopping frequency, is, after demodulation, $I_1$.

Figure 6B:
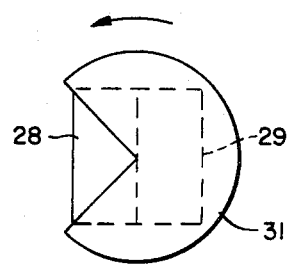
Figure 6C:
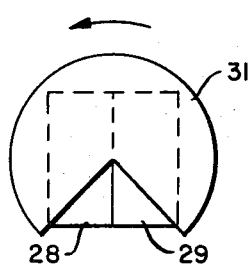
Figure 6D:
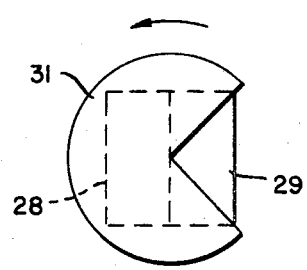
Figure 7:
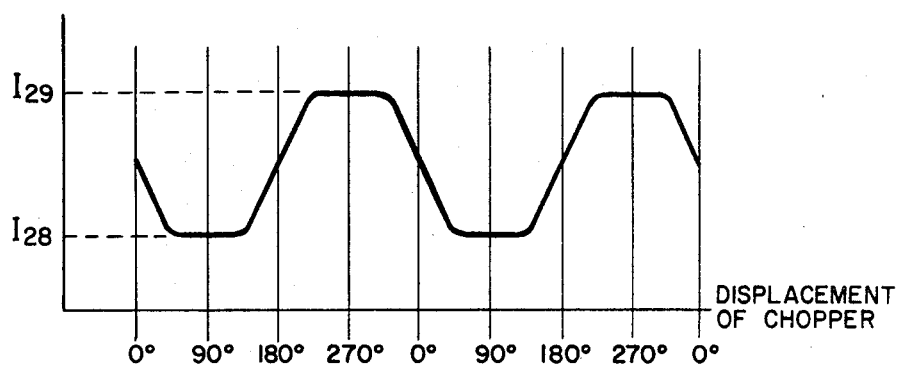
FIG. 7 is the waveform of the output of a photodetector associated with the polariscope of FIG. 1.

The derivation of the intensity of $I_1$ may be most readily understood by reference to FIGS. 6(a), 6(b), 6(c), 6(d) and 7 of the drawings, FIGS. 6(a), 6(b), 6(c) and 6(d) showing four positional relationships of the chopper 31 to the quarter wave plates 28 and 29 and FIG. 7 showing the output of the photoreceptor 32 in response to various angular positions of the chopper 31 when the wedges 11 and 12 are displaced the distance $Y_1$. Referring specifically to FIG. 6(a) and FIG. 7 of the drawings, FIG. 6(a) showing areas of both the plates 28 and 29 exposed to the photoreceptor 32 with the chopper 31 at its 0° angular position as it begins its rotational cycle, it is seen that the light passing through the plates 28 and 29 provides an output from the photoreceptor 32 which has an intensity value between $I_{28}$ and $I_{29}$. As the chopper 31 rotates in the direction shown by the rotational arrow, the area of the plate 29 exposed to the photoreceptor 32 decreases and the area of the plate 28 exposed to the photoreceptor 32 increases. As shown in FIG. 6(b) of the drawings with the chopper 31 rotated 90° only the plate 28 is exposed to the photoreceptor 32. The output from the photoreceptor 32 when the chopper 31 has been rotated 90° is shown in FIG. 7 of the drawings and is equal to $I_{28}$ since only an area of the plate 28 is exposed to the photoreceptor. It is to be noted that with the chopper rotated 90° the output from the photoreceptor is less than it was before the chopper was rotated since, as may be seen by reference to FIG. 4 of the drawings, the intensity of light passing through the plate 28 is less than the intensity of the light passing through the plate 29, and since now only the light passing through the plate 28 is allowed to reach the photoreceptor 32.

Continued rotation of the chopper 31 to a 180° rotational position as shown in FIG. 6(c) of the drawings decreases the area of the plate 28 exposed to the photoreceptor 32 and allows an increasing area of the plate 29 to be exposed to the photoreceptor. The output from the photoreceptor 32 when the chopper 31 is rotated to the 180° position is shown in FIG. 7 of the drawings, and it is to be noted that at this point the output from the photoreceptor 32 is increasing since more and more of the plate 29 is being exposed. Continued rotation of the chopper 31 to the 270° position as shown in FIG. 6(d) of the drawings operates to decrease the amount of the plate 28 which is exposed to the photoreceptor 32 and to increase the amount of the plate 29 which is exposed to the photoreceptor until, when the chopper 31 has reached the 270° rotational position, only an area of the plate 29 is exposed to the photoreceptor. The output from the photoreceptor 32 when the chopper 31 is in the 270° rotational position is shown in FIG. 7 of the drawings and is equal to $I_{29}$. It is to be noted that at this point the output from the photoreceptor 32 is a maximum since only an area of the plate 29, which is passing a greater intensity of light than the plate 28, is exposed to the photoreceptor 32.

As may be seen by reference to FIG. 7, rotation of the chopper 31 provides at the output of the photoreceptor 32 and alternating cycle wave having a maximum amplitude equal to $I_{29}$ and a minimum amplitude equal to $I_{28}$. If the wedges 11 and 12 are further displaced with respect to each other to some displacement other than $Y_1$, providing different light intensities through the plates 28 and 29 as shown in FIG. 4 of the drawings, it is understood that the amplitude of the alternating cycle signal provided at the output of the photoreceptor 32 and shown in FIG. 7 of the drawings would change to correspond with the magnitude of the difference of the light intensities passing through the plates 28 and 29. Therefore, as the wedges 11 and 12 are displaced with respect to each other, providing for varying light intensities through the plates 28 and 29 as shown in FIG. 4 of the drawings, the amplitude of the alternating cycle signal provided at the output of the photoreceptor 32 changes in response to the change in the magnitude of the envelope defined by the curves 19 and 22 of FIG. 4.

The output from the photoreceptor 32 is passed through a noise-elimination band-pass filter 33, which has a narrow bandpass at the chopping frequency and which eliminates any direct current portion of the signal and provides at its output a voltage centered alternating cycle wave, to an amplifier 34 which may be provided with gain control means. The amplified signal is then passed through a demodulator 36 which operates to rectify the signal and to provide a signal envelope to a meter 37, which envelope is represented by the waveform of FIG. 5 of the drawings, where the variations thereof may be read as meter deflections proportional to the magnitude of the difference of the light intensities passing through the plates 28 and 29. It is to be noted that at the points where the curves 19 and 22 of FIG. 4 cross a null is indicated by the meter 37, since at these points the light intensity passing through the plate 28 is equal to the light intensity passing through the plate 29 and the waveform shown in FIG. 7 becomes flat.

In operation, the prism 11 may be positioned along the Y-axis until the null 24 of FIG. 5 is observed on meter 37, defining the reference position for the table or other movable object to which the prism 11 is affixed. After subsequent movement, the object may be returned to its home positioned by reestablishing the null 24, which is far more easy to find than either of the maxima of the curves 19 or 22 of FIG. 4. The device thus described may, for example, be advantageously utilized in the production of etched integrated circuit masks to initialize the location of a workstage supporting a circuit mask which is to be selectively etched. The reference position may then be utilized with a laser interferometer or other precision measuring system for locating the etching areas.

While the specific embodiment of the polarimeter 10 described above shows the prism 12 as being fixed and the prism 11 as being movable, it is obvious that the same results may be obtained if the prism 11 is fixed while the prism 12 is movable. Furthermore, while the best results are obtained with a white light source, any source having fairly wide spectral range may be advantageously utilized. Additionally, either visible or invisible light may be utilized, if suitable detector circuitry is utilized along with birefringent prisms having suitable transmission characteristics. Also, certain other birefringent materials may be employed to provide increased resolution of the system, an example being calcite wedges cut at an angle up to 20°. At 20° such wedges would increase the resolution of the system by a factor of approximately 200.

Thus, it will be appreciated that while certain specific features have been described with respect to the various components of the system described, other alternatives may be utilized. For example, the light chopping means and the detector circuitry described are capable of various arrangements which may be devised by those skilled in the art, which will embody the principles of the invention, without departing from the spirit and scope thereof.

What is claimed is:

1. A method of identifying a point along a linear path which comprises the steps of:
   juxtaposing a pair of wedge-shaped birefringent prisms with their optic axes in orthometric relationship and their thick sides and thin sides correspondingly oriented;
   directing plane-polarized light along a path through said prisms at right angles to the optic axes thereof;
   analyzing the light emerging from said prisms;
   detecting said analyzed light;
   converting said detected light into an electrical signal;
   displacing said prisms relative to each other along a linear path at right angles to the path of said plane-polarized light to vary said signal according to a predetermined pattern having a definitive characteristic at a predetermined point along said linear path; and
   detecting the occurrence of said definitive characteristic to identify said point.

2. A method of identifying a point along a linear path which comprises the steps of:
   juxtaposing a pair of wedge-shaped birefringent prisms with their optic axes in orthometric relationship and their thick sides and thin sides correspondingly oriented;
   directing plane-polarized light along a path through said prisms at right angles to the optic axes thereof;
   modulating the light emerging from said prisms by cyclically shifting the phase of said emerging light 180°;
   analyzing the shifted and unshifted modulated light;
   detecting said analyzed light;
   converting said detected light into first and second electrical signals, respectively;
   generating a composite signal from the first and the second signals, the composite signal being equal to the magnitude of the difference of the first and the second signals;
   displacing said prisms relative to each other along a linear path at right angles to the path of said plane-polarized light to vary said composite signal according to a predetermined pattern having a definitive characteristic at a predetermined point along said linear path; and
   detecting the occurrence of said definitive characteristic to identify said point.

3. A method of identifying a point along a linear path which comprises the steps of:
   juxtaposing a pair of wedge-shaped birefringent prisms with their optic axes in orthometric relationship and their thick sides and thin sides correspondingly oriented;
   directing plane-polarized light along a path through said prisms at right angles to the optic axes thereof;
   modulating the light emerging from said prisms by cyclically advancing and retarding said emerging light 90° in phase;
   analyzing the advanced and retarded modulated light;
   detecting said analyzed light;
   converting said detected light respectively into first and second electrical signals;
   generating a composite signal from the first and the second signals, the composite signal being equal to the magnitude of the difference of the first and the second signals;
   displacing said prisms relative to each other along a linear path at right angles to the path of said plane-polarized light to vary said composite signal according to a predetermined pattern having a definitive characteristic at a predetermined point along said linear path; and
   detecting the occurrence of said definitive characteristic to identify said point.

4. A referencing polariscope which comprises:
   a pair of wedge-shaped birefringent prisms juxtaposed with their optic axes in orthometric relationship and having their thick sides and thin sides correspondingly oriented;
   means for directing plane-polarized light along a path through said prisms at right angles to said optic axes thereof;
   means for displacing said prisms relative to each other along a linear path at right angles to the path of said plane-polarized light;
   means interposed in said light path for analyzing the light emerging from said prisms; and
   means for detecting said analyzed light and converting said light into an electrical signal having a characteristic dependent upon the relative displacement of said prisms.

5. A referencing polariscope which comprises:
   a pair of wedge-shaped birefringent prisms juxtaposed with their optic axes in orthometric relationship and having their thick sides and thin sides correspondingly oriented;
   means for directing plane-polarized light along a path through said prisms at right angles to the optic axes thereof;
   means for displacing said prisms relative to each other along a linear path at right angles to the path of said plane-polarized light;
   means for modulating the light emerging from said prisms by cyclically shifting the phase of said emerging light 180°;
   means interposed in said light path for analyzing the shifted and unshifted modulated light;
   means for detecting said analyzed light and converting said light respectively into first and second electrical signals; and
   means for combining said first and second electrical signals for generating a composite electrical signal having a characteristic dependent upon the relative displacement of said prisms.

6. A polariscope as defined in claim 5, wherein said modulating means includes a half-wave plate means and means for cyclically interposing said half-wave plate means in said light path.

7. A polariscope as defined in claim 5, wherein said modulating means includes a light chopper fabricated from halfawave plate material.

8. A referencing polariscope which comprises:
- a pair of juxtaposed wedge-shaped birefringent prisms having their optic axes in orthometric relationship and having their thick sides and thin sides correspondingly oriented;
- means for directing plane-polarized light along a path through both said prisms at right angles to the optic axes thereof;
- means for displacing said prisms relative to each other along a linear path at right angles to the path of said plane-polarized light;
- means for cyclically modulating the light emerging from said prisms alternately to advance and retard said emerging light 90° in phase;
- means interposed in said light path for analyzing said advanced and retarded modulated light;
- means responsive to said analyzed light for generating first and second electrical signals, respectively, each proportional to the intensity of its associated emerging light; and
- means for combining said alternately generated signals for generating a unitary signal dependent upon the relative displacement of said prisms, said unitary signal being equal to the magnitude of the difference of the first and the second signals.

9. A polariscope as defined by claim 8, wherein said modulating means comprises two quarter-wave shifter plates interposed in said light path and a light chopper for alternately blocking the light through one or the other of said plates.

10. A position referencing polariscope for uniquely defining a point along a linear path in space, which comprises:
- a source of white light for generating a beam;
- means for plane polarizing said beam;
- a pair of juxtaposed wedge-shaped birefringent prisms interposed in said polarized beam, having their optic axes in orthometric relationship and having their thick sides and thin sides correspondingly oriented;
- means for displacing said prisms relative to each other along a linear path at right angles to the path of said plane-polarized light;
- a pair of quarter-wave shifter plates oriented side-by-side in a plane at right angles to, and interposed in the path of, said beam for respectively advancing and retarding said polarized light 90° in phase;
- a light chopper interposed in said light path for alternately blocking the light through one or the other of said quarter-wave plates;
- an analyzer interposed in said light path for plane-polarizing the light passed by said chopper;
- photoreceptor means for converting the light through said analyzer into an amplitude modulated electrical signal having a carrier at the chopping frequency and an amplitude envelope dependent upon the relative displacement of said prisms, said envelope having at least two adjacent peaks of intensity defining a sharp null therebetween at a predetermined point along the path of displacement of said prisms;
- a detecting circuit for demodulating said electrical signal; and
- output means coupled to said detector circuit for indicating the instantaneous amplitude of said envelope, whereby said predetermined displacement of said prisms produces said null.

11. An apparatus as defined in claim 10, wherein said detecting circuit includes a band-pass filter coupled to said photoreceptor, means for amplifying the output of said band-pass filter, and a demodulator coupled to said amplifying means for rectifying the output thereof.

12. An apparatus as defined in claim 10, wherein the initial plane of polarization of said light is at 45° with respect to the optic axes of said prisms.

* * * * *